United States Patent Office 3,347,690
Patented Oct. 17, 1967

3,347,690
ASPHALT COMPOSITIONS
Thomas J. Galvin and Francis A. Hughes, Wilmington, Del., assignors to Atlas Chemical Industries, Inc., Wilmington, Del., a corporation of Delaware
No Drawing. Filed Apr. 15, 1964, Ser. No. 360,121
7 Claims. (Cl. 106—273)

The present invention relates to the production of asphaltic compositions, such as those used in paving roads, which have a reduced stripping tendency.

Asphaltic mixtures composed of mineral aggregate and bituminous constituents are widely used in the road construction industry. This type of paving composition, while economical and durable, has a disadvantage of being subject to deterioration by moisture. One type of deterioration results from the mineral aggregate having a greater affinity for moisture than for asphalt. In many cases it is difficult, if not impossible, to coat wet mineral aggregate satisfactorily with asphaltic compositons. Even when aggregate is already wet or coated with asphalt, water or water vapor slowly permeates the asphalt and loosens or strips the asphalt from the aggregate. Generally aggregates constitute from 80 to 85 percent of the bulk of a bituminous paving mixture and from 90 to 95 percent of the weight of the mixture. The effect of water (susceptibility) is manifested at the interface between the bituminous binder and the aggregate.

Aggregate used in road construction is hydrophilic, which means that rock is preferentially wetted by water rather than by asphalt. At any break in an asphalt coating of a rock particle when water is present, the surface-tension forces work to disengage asphalt from aggregate and to contract asphalt films into islands lying on rather than adhering to the rock surfaces.

The bituminous road building industry currently employs two methods for coating road-type aggregates with asphalt, the hot mix method and the emulsion or cutback method. In the former, the aggregates are carefully dried by heat and then mixed with hot asphalt at temperatures of 280–375° F. In the latter; the aggregates do not undergo a pretreatment but are simply cold mixed with an emulsion or solvent cutback of the asphalt.

Both methods have water as a common enemy. The hot mix method depends upon pretreatment of the aggegate to remove water, while the emulsion method depends upon good mixing due to lower viscosity of the emulsion. In both methods, it is essential that the water be removed from the aggregate in order that the hydrophobic asphalt may properly coat the aggregate.

The coating and stripping problems briefly described above have led to the incorporation of various chemicals with the asphalt mix to improve the coating of the aggregates by the asphalt, and, once coated, to improve adhesion of the asphalt to the aggregate. Typical of these agents are the materials recited in U.S. Patents 2,706,688, 3,096,191, 3,096,192, and 3,097,179.

In accord with the present invention an asphaltic mixture comprised of asphalt and an anti-stripping additive selected from the group of amines and amine salts consisting of: (1) a reaction product of an aminating agent of ammonia or a primary or secondary amine containing from 1 to 6 carbon atoms, for example, methyl amine, ethyl amine, diethyl amine, with an amine of the general formula:

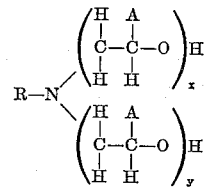

in which R is an alkyl or alkylene radical containing between 12 and 20 carbon atoms, A is selected from the group consisting of H and $CH_3$, and in which $x$ and $y$ are integers, one of which may be zero and $x$ plus $y$ equals from about 7 to about 27; (2) a reaction product of ammonia or a primary or secondary amine containing from 1 to 6 carbon atoms, for example, methyl amine, ethyl amine, diethyl amine, with a hydroxy-containing material of the general formula:

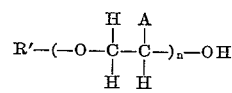

wherein R' contains from 12 to 20 carbon atoms and is selected from the group consisting of alkyl, alkylene, and alkaryl radicals, A is selected from the group consisting of H and $CH_3$, and $n$ is a number from about 3 to about 16; (3) salts of (1) with a mineral acid or an organic acid selected from the group consisting of acetic, oleic, lauric, stearic, propionic, napthenic and resin acids, and; (4) salts of (2) with a mineral acid or an organic acid selected from the group consisting of acetic, oleic, lauric, stearic, propionic, naphthenic and resin acids.

The term "asphalt" as used herein is meant to cover semi-solid or solid cementitious mixtures of natural or pyrogenous origin, or a combination of both, in which bitumens are the sole or predominate constituent. Generally these mixtures are soluble or substantially soluble in carbon bisulfide. Naturally occurring or native asphalts and pyrogenous asphalts useful in the practice of the present invention include materials such as albertite, elaterite, gilsonite, grahamite, wurtzilite, trinidad or bermudez lake asphalts, and those asphalts obtained by refining petroleum by distillation, precipitation, cracking, solvent extraction, or similar operations, for example, distillation residues, still bottoms, cracked residues, straight-run residues, asphaltic bitumens, and blown asphalt. Suitable asphalts may be in the form of solvent solutions or emulsions.

Descriptions of aminated polyoxyalkylene fatty amines, particularly those of group (1) above, which are aptly suited to use in the present invention, along with descriptions of suitable methods of preparing such amines, are given in detail in application No. 360,125, filed by John D. Zech, and in application No. 360,129, filed by R. A. Hales and F. A. Hughes, both of even date herewith. Generally, the aminated compounds of group (2) above may be prepared by initially reacting a hydroxy-containing material, for example, nonyl phenol, with the desired number of moles of alkylene oxide by heating the reactants under a slight pressure to a temperature of around 140° C. The alkylene oxide addition reaction is advantageously carried out in the presence of an alkaline catalyst such as, sodium hydroxide or sodium methylate. A suitable addition process is described in U.S. Patent 2,636,038, dated Apr. 21, 1953 to John D. Brandner. The polyoxyalkylene product may then be aminated by heating with ammonia in the presence of a hydrogenation catalyst, such as Raney nickel. Frequently, temperatures in the range of from about 150° C. to about 275° C. are required. Suitable amines, particularly those of group (2) above, may be prepared by the method described in presently pending application No. 360,125, filed by John D. Zech, and in application No. 360,129, filed by R. A. Hales and F. A. Hughes, both of even date herewith. Suitable amines, particularly those of group (2) above, may be prepared by the method described in presently pending application No. 360,125, filed by John D. Zech, and in application No. 360,129, filed by R. A. Hales and F. A. Hughes, both of even date herewith. The nomenclature utilized herein in referring to the amine materials useful in the present invention is to utilize the name of the parent compound and precede that name by the number of amino groups which have replaced hydroxyl groups. For example, an amine derived from 12 polyoxyethylene tridecyl alcohol is referred to as amino 12 polyoxyethylene tridecyl alcohol. Examples of amines suited to use in the present invention are: amino 5 polyoxyethylene-nonylphenol, amino bis-(5 polyoxyethylene-nonylphenol), monoamino and diamino 20 polyoxyethylene Armeen TD (Armeen TD is a product of Armour & Co.), amino bis-(6 polyoxyethylene-tridecylalcohol), and triamino 20 polyoxyethylene sorbitol.

The term "aggregate" as used herein is meant to cover inert material, such as sand gravel, shell, slag, or broken stone, or combinations thereof, which range in size from about 3 inch diameter pieces useful in macadam pavements to sizes finer than a number 10 USS screen useful in sheet and sand asphalt pavement mixtures. Filler materials, such as crusher dust and natural fines, may also be included.

The asphaltic mixtures of the present invention in addition to being useful as a binder road construction material, are useful components in products such as foundry core binder mixtures, roof and pipe coatings, floor mastics, caulking compounds, and automobile undercoating. Sufficient anti-stripping additive is generally used to give good adhesiveness to the mixture. Generally upwards from about 0.1% by weight of the asphalt material is sufficient to fulfill this requirement. Usually amounts of additive of over about 5.0% by weight of the asphalt mixture yield no obvious improvement. A suitable range of additive found to be both efficient and economical for the present mixtures is from about 0.5 to about 1.5% by weight of the asphalt mixture.

The following examples shown in tabular form are illustrative of the preparation of asphaltic mixtures compounded in accordance with the present invention. Each of the examples in the following table were conducted in the same manner, e.g., in each case a 0.5 gram portion of anti-stripping additive was mixed with a 100 gram portion of RC 3 Cutback Asphalt (a product of Atlantic Refining Company) and the mixture heated at about 38° C. with stirring until uniform mixture was obtained. One gram of the asphalt plus additive mixture was then added to 50 grams of Ottawa sand which was completely covered with 50 ml. of water and contained in a 4 oz. bottle. This mixture was then hand shaken for 1 minute followed by a 10 minute shaking on a laboratory shaker. The initial coating of the sand by the asphalt was noted as well as the percentage of asphalt stripped from the sand during storage periods of 1 and 2 hours at an elevated temperature (100° C.) to accelerate stripping. The samples were then stored at 50° C. for a period of 64 additional hours and the amount of stripping noted. The amount of stripping was visually observed and qualitatively estimated by comparison with a 100% coated sand sample. In Test 1 of the following table 0.5 gram of amino 5 polyoxyethylene nonylphenol was mixed with 100 grams of RC 3 Cutback Asphalt and the mixture stirred and heated to 38° C. until smooth. One gram of the mixture was then added to a 4 oz. bottle containing 50 grams of Ottawa sand covered by 50 ml. of water. The resultant mixture was hand shaken for 1 minute and machine shaken for 10 minutes. The mixture was then heated to 100° C. and the percentage of stripping noted. After periods of 1 and 2 hours no stripping was noted After an additional 64 hours at 50° C. the sample was again observed and no stripping was evident. The organic acid salts of the amines were formed by mixing chemical equivalents of the amine and the acid together, for example, in Test 2 equivalents of amino 5 polyoxyethylene nonylphenol and acetic acid were reacted by mixing together to form the acetate of the monoamine.

TABLE I

| Anti-stripping additive | Percent by Wt. Nitrogen | Initial Coating (percent) | Stripping (percent) at — | | |
|---|---|---|---|---|---|
| | | | 100° C., 1 Hour | 100° C., 2 Hours | 50° C., 64 Hours |
| (1) Aminated 5 polyoxyethylene nonylphenol | 2.5 | 100 | 0 | 0 | 0 |
| (2) Acetate salt of (1) | | 100 | 0 | 0 | 0 |
| (3) Oleate salt of (1) | | 100 | 0 | 0 | 0 |
| (4) Aminated (5 polyoxyethylene nonylphenol) | 0.9 | 100 | 25 | 50 | 50 |
| (5) Acetate salt of (4) | | 100 | 25 | 25 | 25 |
| (6) Oleate salt of (4) | | 100 | 25 | 25 | 25 |
| (7) Aminated 20 polyoxyethylene tallow amine (Armeen TD) | 3.4 | 100 | 0 | 0 | 0 |
| (8) Acetate salt of (7) | | 100 | 0 | 0 | 0 |
| (9) Oleate salt of (7) | | 100 | 0 | 0 | 0 |
| (10) Aminated 6 polyoxyethylene tridecyl alcohol | 2.5 | 100 | 0 | 0 | 0 |
| (11) Acetate salt of (10) | | 100 | 0 | 25 | 25 |
| (12) Oleate salt of (10) | | 100 | 25 | 25 | 25 |
| | | | | | 0 |
| (13) Aminated (6 polyoxyethylene tridecyl alcohol) | 1.4 | 100 | 0 | 25 | 25 |
| (14) Acetate salt of (13) | | 100 | 25 | 25 | 25 |
| (15) Oleate salt of (13) | | 100 | 0 | 0 | 0 |
| (16) Aminated 12 polyoxyethylene tridecyl alcohol oleate | 1.3 | 100 | 25 | 50 | 50 |
| (17) Aminated 5 polyoxyethylene tallow alcohol | 2.2 | 100 | 25 | 25 | 25 |
| (18) Aminated 13 polyoxyethylene tallow alcohol | 1.2 | 100 | 0 | 25 | 75 |

Table 2 below shows the results of a series of tests carried out in a manner generally similar to the procedure used in the tests shown in Table I. 80% by weight of BM 1 asphalt (a product of Atlantic Refining Co.) in 20% by weight of naptha was utilized as the asphaltic component. Various concentrations of anti-stripping additives were tested. Storage tests on various concentrations were conducted at 25° C. for 48 hours and at 50° C. for 48 hours. For example, in Test 19, amino 5 polyoxyethylene nonylphenol was tested at concentrations of 0.5, 1.0 and 1.5% by weight for initial coating and observed for the percentage of stripping after 48 hours at 25° C. and 48 hours at 50° C.

a hydroxy-containing material of the general formula

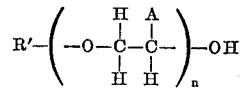

wherein R' contains from 12 to 20 carbon atoms and is selected from the group consisting of alkyl, alkylene and alkaryl radicals, A is selected from the group consisting of H and $CH_3$, and $n$ is a number from about 3 to about 16, said reaction product being prepared in the presence of a hydrogenation catalyst and at a temperature from about 150° C. to about 275° C.,

TABLE II

| Anti-Stripping Additive | Percent by Wt. Nitrogen | Initial Coating (percent) | | | Percent Stripping at— | | | | | |
|---|---|---|---|---|---|---|---|---|---|---|
| | | | | | 48 Hours at 25° C. | | | 48 Hours at 50° C. | | |
| | | 0.5 | 1.0 | 1.5 | 0.5 | 1.0 | 1.5 | 0.5 | 1.0 | 1.5 |
| (19) Aminated 5 polyoxyethylene nonylphenol | 2.5 | 100 | 100 | | 0 | 0 | | 0 | 0 | |
| (20) Acetate salt of (19) | | 75 | 100 | | 25 | 0 | | 25 | 0 | |
| (21) Oleate salt of (19) | | 75 | 100 | | 25 | 0 | | 25 | 0 | |
| (22) Aminated 20 polyoxyethylene tallow amine (Armeen TD) | 3.4 | 100 | 100 | | 0 | 0 | | 0 | 50 | |
| (23) Acetate salt of (22) | | 75 | 100 | | 25 | 0 | | 50 | 0 | |
| (24) Oleate salt of (22) | | 50 | 75 | | 50 | 25 | | 50 | 25 | |
| (25) Aminated 6 polyoxyethylene tridecyl alcohol | 2.5 | 100 | 100 | | 0 | 0 | | 0 | 0 | |
| (26) Acetate salt of (25) | | 75 | 100 | | 50 | 0 | | 75 | 0 | |
| (27) Aminated (6 polyoxyethylene tridecyl alcohol) | 1.4 | 0 | 50 | 100 | | 50 | 0 | | 50 | 0 |
| (28) Aminated 12 polyoxyethylene tridecyl alcohol | 1.3 | 75 | 100 | | 25 | 0 | | 50 | 0 | |

What is claimed is:
1. An asphaltic mixture comprised of
asphalt, and
an anti-stripping additive selected from the group of amines and amine derivatives consisting of
(1) a reaction product of
an aminating agent selected from the group consisting of ammonia, alkyl unsubstituted primary amines, and alkyl unsubstituted secondary amines containing from 1 to 6 carbon atoms, with
a compound of the general formula

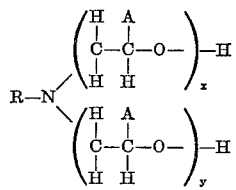

wherein R is selected from the group consisting of alkyl and alkylene radicals containing between 12 and 20 carbon atoms, A is selected from the group consisting of H and $CH_3$, and in which $x$ and $y$ are integers one of which may be 0 and $x$ plus $y$ equals from about 7 to about 27, said reaction product being prepared in the presence of a hydrogenation catalyst and at a temperature from about 150° C. to about 275° C.,
(2) a reaction product of
an aminating agent selected from the group consisting of ammonia, alkyl unsubstituted primary amines and alkyl unsubstituted secondary amines containing from 1 to 6 carbon atoms, with (3) salts of (1) with an organic acid selected from the group consisting of acetic, oleic, lauric, stearic, propionic, naphthenic and resin acids, and;
(4) salts of (2) with an organic acid selected from the group consisting of acetic, oleic, lauric, stearic, propionic, naphthenic and resin acids.
2. The mixture of claim 1 with aggregate.
3. The mixture of claim 1 wherein A is H.
4. The mixture of claim 1 wherein the anti-stripping additive is
amino 5 polyoxyethylene-nonylphenol.
5. The mixture of claim 1 wherein the anti-stripping additive is
amino 6 polyoxyethylene tridecyl alcohol.
6. The mixture of claim 1 wherein the anti-stripping additive is
amino bis-(6 polyoxyethylene-tridecyl alcohol).
7. The mixture of claim 1 wherein the anti-stripping additive is
aminated 20 polyoxyethylene-tallow amine.

References Cited
UNITED STATES PATENTS 2,508,429 5/1950 Smith et al. _____ 106—273
2,759,839 8/1956 Crews et al. _____ 106—273
3,097,179 7/1963 Ceintrey _____ 106—277 XR ALEXANDER H. BRODMERKEL, *Primary Examiner.*

DONALD J. ARNOLD, *Examiner.*

J. B. EVANS, *Assistant Examiner.*

UNITED STATES PATENT OFFICE
CERTIFICATE OF CORRECTION

Patent No. 3,347,690                              October 17, 1967

Thomas J. Galvin et al.

It is hereby certified that error appears in the above numbered patent requiring correction and that the said Letters Patent should read as corrected below.

Column 5, lines 42, 43, 65 and 66, for "alkyl unsubstituted", each occurrence, read -- unsubstituted alkyl --.

Signed and sealed this 18th day of March 1969.

(SEAL)
Attest:

Edward M. Fletcher, Jr.
Attesting Officer

EDWARD J. BRENNER
Commissioner of Patents